US010762869B2

(12) United States Patent
Fuse et al.

(10) Patent No.: US 10,762,869 B2
(45) Date of Patent: Sep. 1, 2020

(54) INFORMATION PRESENTATION APPARATUS AND METHOD THAT DISPLAY TARGET INFORMATION

(71) Applicant: FUJI XEROX CO., LTD., Tokyo (JP)

(72) Inventors: Tohru Fuse, Kanagawa (JP); Shinobu Ozeki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/918,356

(22) Filed: Mar. 12, 2018

(65) Prior Publication Data
US 2018/0350319 A1 Dec. 6, 2018

(30) Foreign Application Priority Data
Jun. 6, 2017 (JP) ................. 2017-111787

(51) Int. Cl.
G09G 5/00 (2006.01)
G09G 5/14 (2006.01)
G01C 21/36 (2006.01)
G06F 3/147 (2006.01)
G06F 3/14 (2006.01)

(52) U.S. Cl.
CPC ......... *G09G 5/003* (2013.01); *G01C 21/3661* (2013.01); *G06F 3/147* (2013.01); *G06F 3/1454* (2013.01); *G09G 5/14* (2013.01); *G09G 2320/10* (2013.01); *G09G 2340/145* (2013.01); *G09G 2354/00* (2013.01); *G09G 2370/022* (2013.01); *G09G 2370/16* (2013.01)

(58) Field of Classification Search
CPC ...................................................... G09G 5/003
USPC ........................................................ 345/635
See application file for complete search history.

(56) References Cited

U.S. PATENT DOCUMENTS

| 2008/0004950 | A1* | 1/2008 | Huang | |
| 2015/0279321 | A1* | 10/2015 | Falconer | G09G 5/10 345/589 |
| 2016/0232878 | A1* | 8/2016 | Chen | G09G 5/14 |
| 2018/0357981 | A1* | 12/2018 | Ng | G09G 5/14 |

FOREIGN PATENT DOCUMENTS

JP          2011-118556 A          6/2011

* cited by examiner

Primary Examiner — Shivang I Patel
(74) Attorney, Agent, or Firm — Oliff PLC

(57) ABSTRACT

An information presentation apparatus includes a detector and a display. The detector detects a predetermined target person to whom information is to be presented. When plural target persons to whom pieces of different information are to be presented, respectively are detected by the detector, the display displays target information that indicates each of the target persons and presentation information that corresponds to each of the target persons.

19 Claims, 11 Drawing Sheets

INFORMATION PRESENTATION APPARATUS AND METHOD THAT DISPLAY TARGET INFORMATION

CROSS-REFERENCE TO RELATED APPLICATIONS

This application is based on and claims priority under 35 USC 119 from Japanese Patent Application No. 2017-111787 filed Jun. 6, 2017.

BACKGROUND

Technical Field

The present invention relates to an information presentation apparatus, an information presentation system, an information method, and a non-transitory computer readable medium.

SUMMARY

According to an aspect of the invention, an information presentation apparatus includes a detector and a display. The detector detects a predetermined target person to whom information is to be presented. When plural target persons to whom pieces of different information are to be presented, respectively are detected by the detector, the display displays target information that indicates each of the target persons and presentation information that corresponds to each of the target persons.

BRIEF DESCRIPTION OF THE DRAWINGS

Exemplary embodiments of the present invention will be described in detail based on the following figures, wherein.

DETAILED DESCRIPTION

Figure 1:
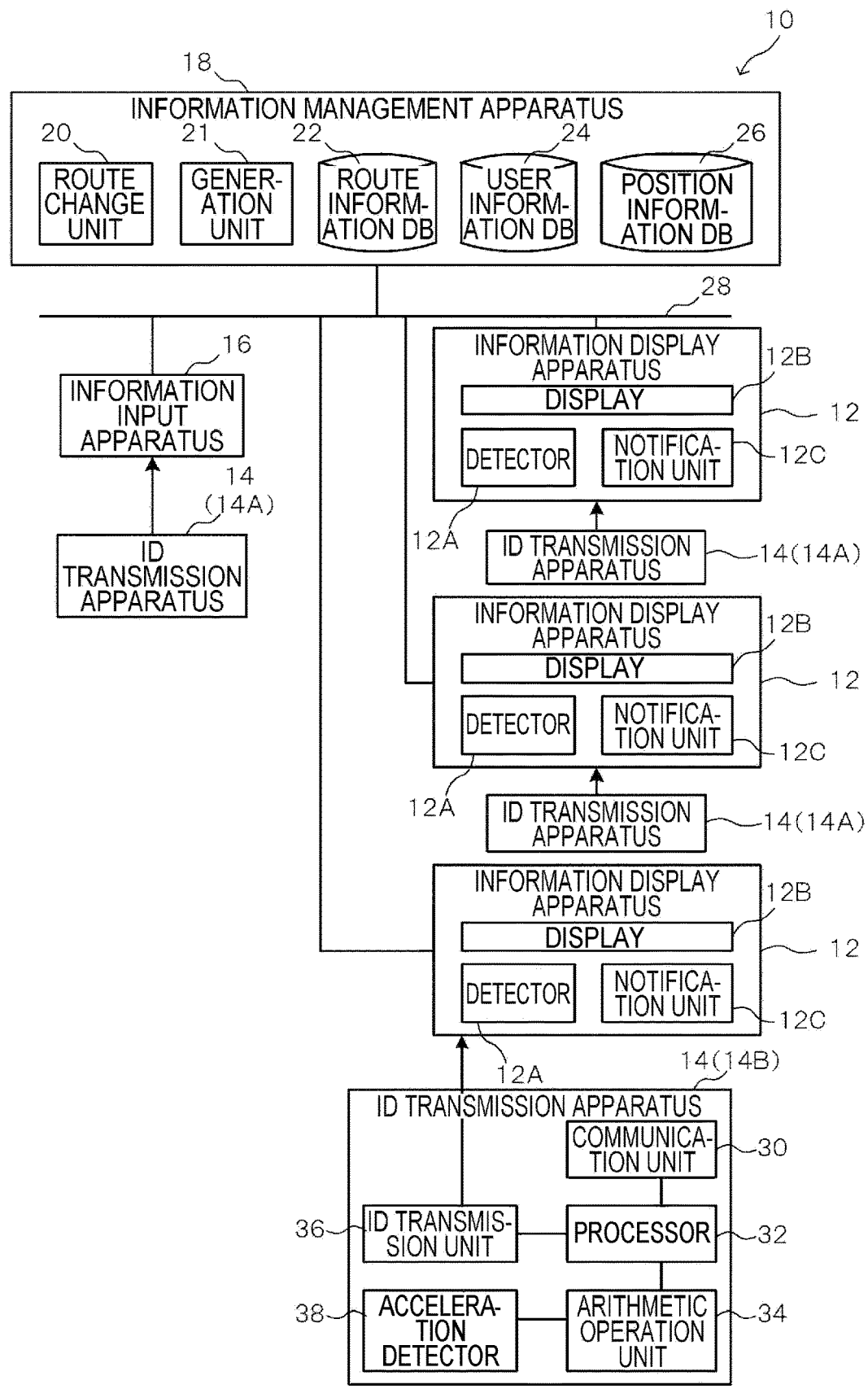
FIG. 1 is a block diagram illustrating a schematic configuration of an information presentation system according to an exemplary embodiment.

Hereinafter, an example of an exemplary embodiment of the present invention will be described in detail with reference to the accompanying drawings. FIG. 1 is a block diagram illustrating a schematic configuration of an information presentation system 10 according to the exemplary embodiment.

The information presentation system 10 according to the exemplary embodiment includes an information display apparatus 12, an identification (ID) information transmission apparatus 14 (14A and 14B), an information input apparatus 16, and an information management apparatus 18. Each apparatus is connected to a communication network 28 such as a network.

The information display apparatus 12 includes a detector 12A and a display 12B. The detector 12A acquires identification information for identifying a guided person who is present within a predetermined range. The display 12B displays guidance information corresponding to the identification information. With this configuration, the information display apparatus 12 presents the guidance information to the guided person. Specifically, the detector 12A wirelessly communicates with the ID transmission apparatus 14 carried by the guided person to acquire the identification information transmitted by the ID transmission apparatus 14. That is, the detector 12A of the information display apparatus 12 detects the ID transmission apparatus 14 which is located within the predetermined range that depends on a communicable distance, to acquire the identification information.

The ID transmission apparatus 14 is carried by the guided person and transmits the identification information for identifying the guided person. The ID transmission apparatus 14 may adopt, for example, a wireless tag such as radio frequency identification (RFID) or adopt a portable terminal in which a communication function and a display function are added to a wireless tag. Alternatively, a portable terminal capable of performing various types of wireless communication such as a smart phone may be applied. FIG. 1 illustrates an example of the information presentation system 10 including the ID transmission apparatus 14A to which the wireless tag or the like is applied and the ID transmission apparatus 14B to which the portable terminal is applied. Alternatively, the information presentation system 10 may have either the ID transmission apparatus 14A or 14B. The ID transmission apparatus 14B to which the portable terminal is applied includes, for example, a communication unit 30, a processor 32, an arithmetic operation unit 34, an ID transmission unit 36, and an acceleration detector 38 as illustrated in FIG. 1. The communication unit 30 communicates with a line network such as a public switched network. The processor 32 performs various processes such as a display process of the portable terminal. The arithmetic operation unit 34 performs an arithmetic operation for performing various processes, and the like. In addition, the acceleration detector 38 detects an acceleration including a direction of the acceleration applied to the portable terminal. The ID transmission unit 36 transmits the identification information for identifying the portable terminal. Further, the ID transmission apparatus 14B has a notification function such as a function of displaying information received from the outside. In addition, the ID transmission apparatus 14B may have a positioning function such as a global positioning system (GPS).

The information input apparatus 16 is used by the guided person who carries the ID transmission apparatus 14 to input user information regarding a destination and the guided person in advance. For example, a personal computer may be applied to the information input apparatus 16. Alternatively, a portable terminal such as a smart phone may be adopted. When the portable terminal is applied, an application or the like may be installed in the ID transmission apparatus 14B such that the ID transmission apparatus 14B serves as the information input apparatus 16. Further, destination information and the user information on the guided person which are input to the information input apparatus 16 in advance are transmitted to the information management apparatus 18.

The information management apparatus 18 includes a route information database (DB) 22, a user information DB 24, a position information DB 26, and a route change unit 20.

The route information DB 22 stores guidance information regarding a route within a predetermined range. Route information corresponding to the destination information transmitted from the information input apparatus 16 is searchable.

The user information DB 24 stores user information regarding the guided person who is registered in advance by the information input apparatus 16 or the like, for each identification information for identifying the guided person.

The position information DB 26 stores information such as a position where the information display apparatus 12 is disposed. The stored position information is used when the route guidance is displayed.

Herein, a route guidance method for the guided person which is performed by the information presentation system 10 according to the exemplary embodiment will be specifically described.

First, in the information presentation system 10 according to the exemplary embodiment, the guided person operates the information input apparatus 16 to perform user registration. As for the user registration, the user information on the guided person is stored in the user information DB 24 by registering the user information on the guided person, which is input to the information input apparatus 16, in the information management apparatus 18 together with the identification information for identifying the guided person. Further, the guided person operates the information input apparatus 16 to input the destination information together with the user information, registers the destination information in the user information DB 24 as well, and departs for the destination. The guided person may input the identification information of the guided person by operating the information input apparatus 16. Alternatively, the information input apparatus 16 may acquire the identification information of the guided person from the ID transmission apparatuses 14A and 14B by communication and register the acquired identification information in the user information DB 24.

When the guided person departs for the destination while carrying the ID transmission apparatus 14 and approaches the information display apparatus 12, the detector 12A of the information display apparatus 12 acquires the identification information from the ID transmission apparatus 14 carried by the guided person and requests the route guidance information corresponding to the identification information to the information management apparatus 18.

Figure 2:
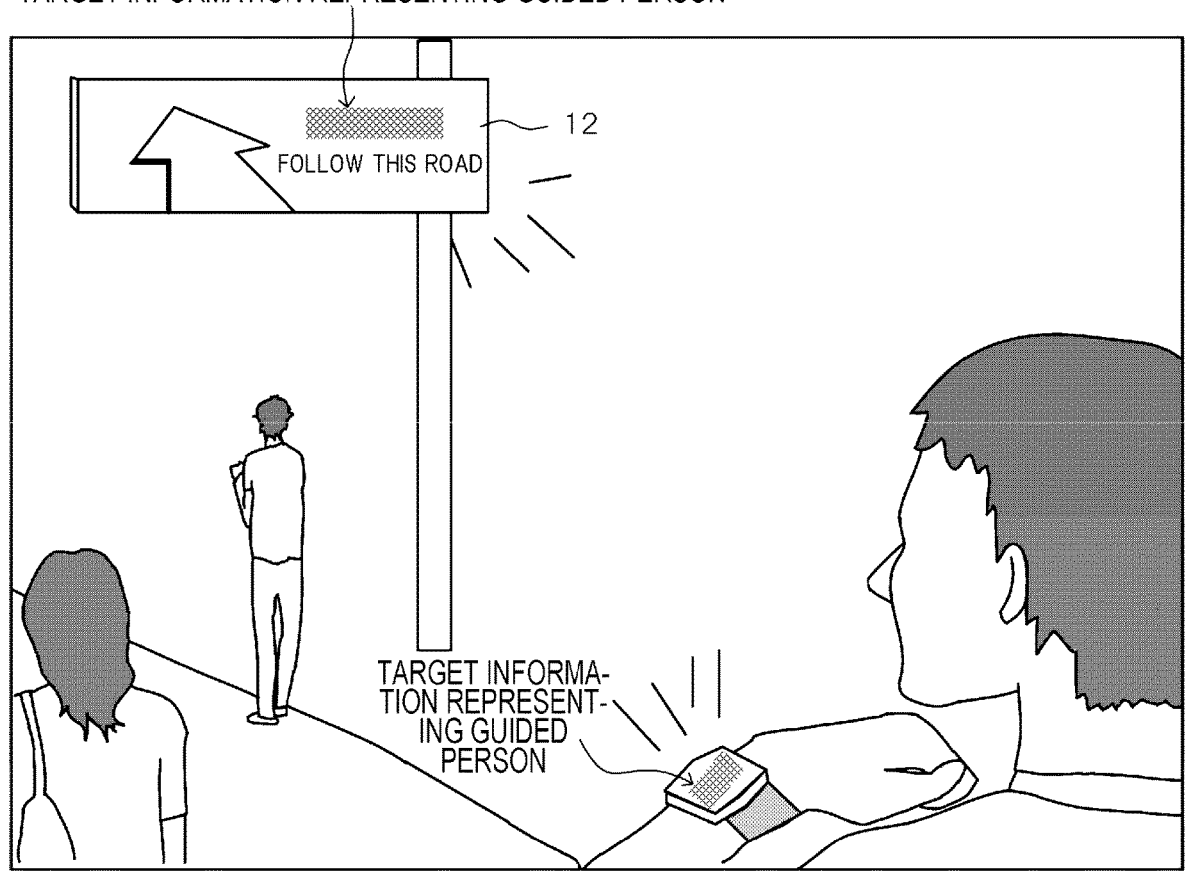
FIG. 2 is a diagram illustrating an example in which target information representing a guided person is displayed on a portable terminal such as a wearable terminal and target information and route guidance information are displayed on an information display apparatus.
Figure 3:
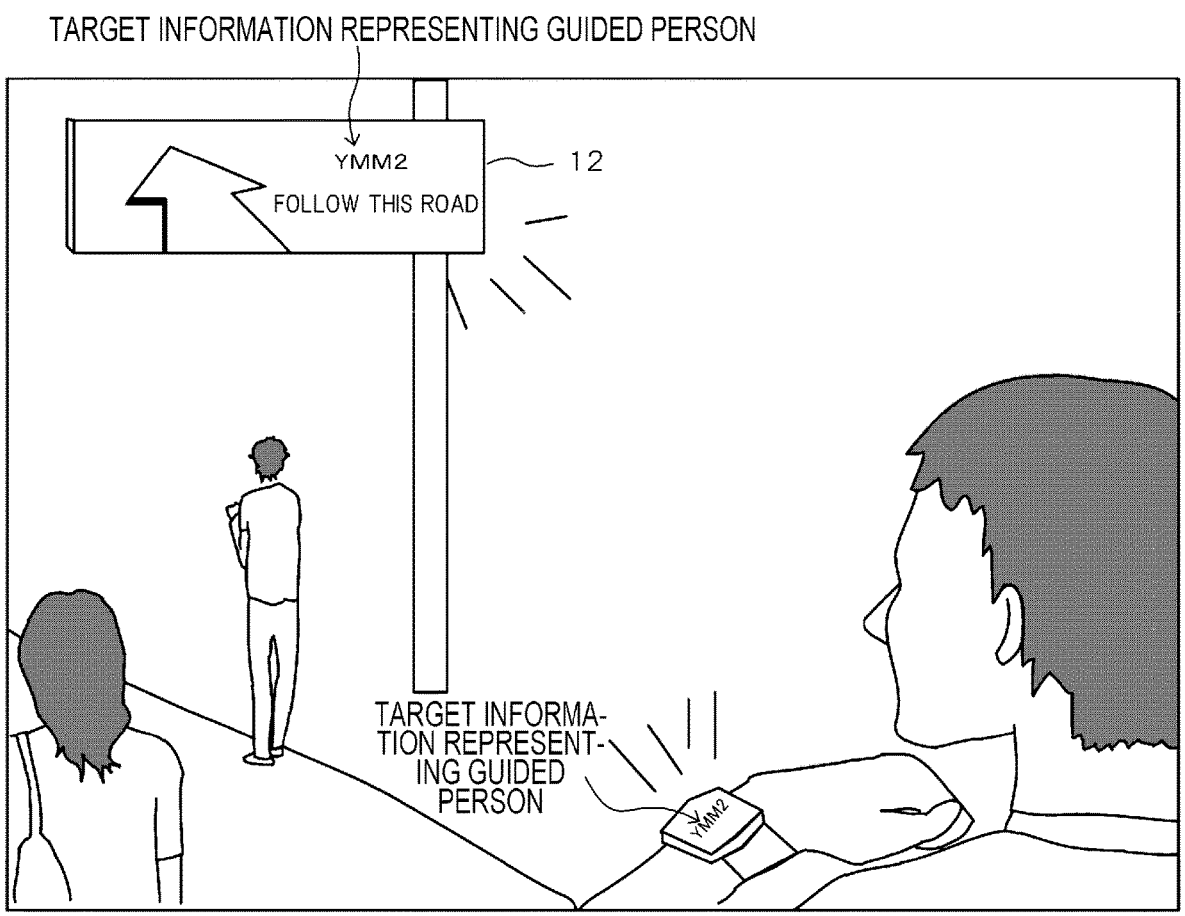
FIG. 3 is a diagram illustrating another display example of the target information.

When the request for the route guidance information is made from the information display apparatus 12, the information management apparatus 18 reads the destination corresponding to the identification information from the user information DB 24, reads the position information of the information display apparatus 12 which is a request source from the position information DB 26, searches the route information stored in the route information DB 22 for the route guidance information from the information display apparatus 12, which is the request source, to the destination, and transmits a search result to the information display apparatus 12. As a result, the display 12B of the information display apparatus 12 displays the route guidance information for each guided person which is transmitted from the information management apparatus 18. Further, when the display 12B of the information display apparatus 12 displays the route guidance information, the display 12B displays target information representing the guided person together with the route guidance information. As a result, even when plural guided persons having different destinations exist, the display 12B displays the route guidance information for each guided person. For example, when the guided person carries the portable terminal such as the wearable terminal, the target information representing the guided person is displayed on the portable terminal and the target information and the route guidance information is displayed on the information display apparatus 12, as illustrated in FIG. 2. For example, examples of the target information include colors, icons, and symbol marks. Specifically, by using different colors, the route guidance such as turning right for a green group and turning left for a yellow group is provided. When the icons or symbol marks are used, for example, an icon of Tokyo Tower, an icon of Kabuki Theatrical Corporation, and the like are prepared, and a set of (i) a direction to be traveled and (ii) an icon or a symbol mark is displayed at each position where the information display apparatus 12 is disposed. Alternatively, as illustrated in FIG. 3, a symbol, a nickname, or the like may be displayed as the target information. In addition, as for notification of the target information to the guided person, for example, when the user registration is performed by the information input apparatus 16, the information management apparatus 18 notifies what information the target information from the information management apparatus 18 is, to the guided person. Specifically, in the case of the ID transmission apparatus 14A such as the wireless tag, the target information (for example, a color, an icon, or a symbol mark) may be notified to the guided person in advance. On the other hand, in the case of the ID transmission apparatus 14B such as the portable terminal, the target information may be transmitted from the information management apparatus 18 to the ID transmission apparatus 14B at the time of user registration. Further, the portable terminal may have a function of sending a sign such as vibration or flash to notify that a route is wrong if the guided person carries the portable terminal such as the wearable terminal and if the guided person goes to a wrong route.

Further, the information display apparatus 12 has such a function that when the guided person approaches the information display apparatus 12, the information display apparatus 12 changes a display mode according to a distance between the information display apparatus 12 and the guided person.

Figure 4A:
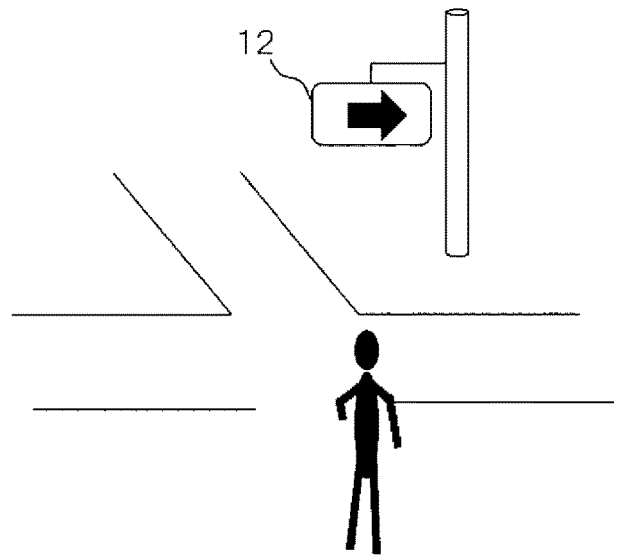
FIG. 4A is a diagram illustrating a display example when a direction of travel is displayed as the route guidance information.
Figure 4B:
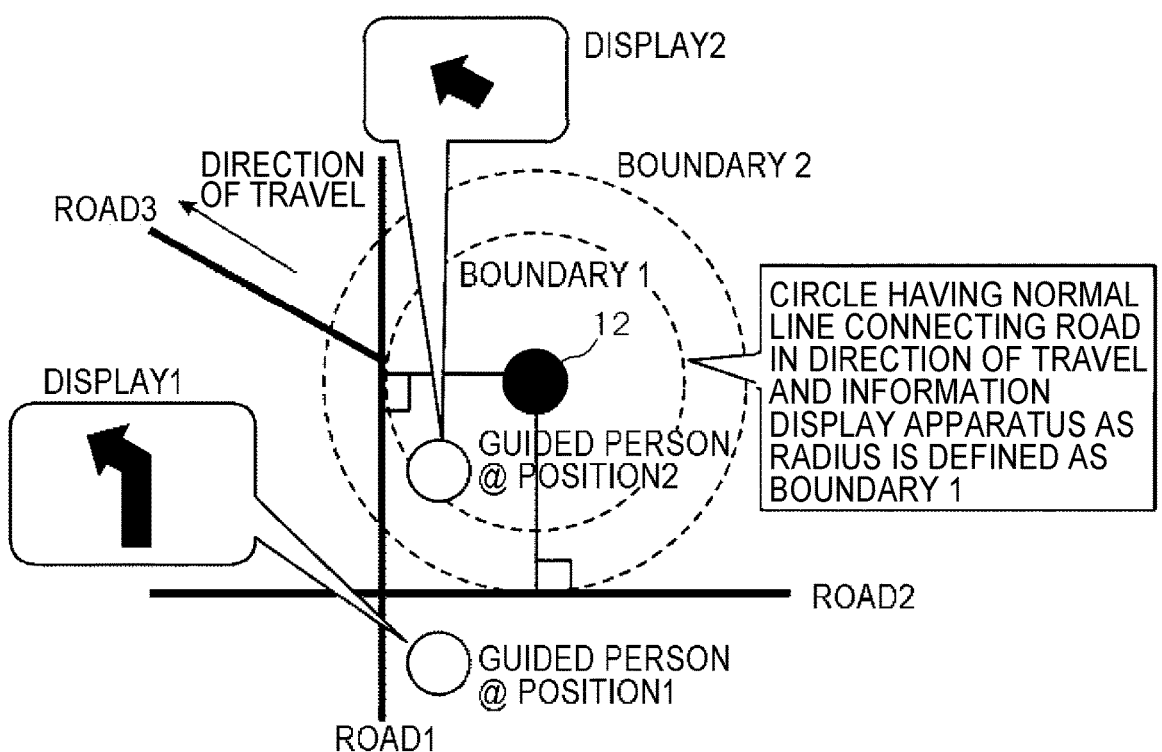
FIG. 4B is a diagram illustrating another display example according to a position of a guided person with respect to the information display apparatus.

When the guided person approaches the information display apparatus 12, the information display apparatus 12 displays the route guidance information corresponding to the destination. For example, when displaying the direction of travel as the route guidance information as illustrated in FIGS. 4A and 4B, the information display apparatus 12 displays the route guidance information (arrow image) in different display modes according to the position of the guided person with respect to the information display apparatus 12.

Specifically, it is assumed that a circle having a center at a position of the information display apparatus 12 and having a normal line connecting a road in the direction of travel and the information display apparatus 12 as a radius is defined as a boundary 1 and that a circle having a center at the position of the information display apparatus 12 and having a normal line connecting a road (N−1)-th intersecting with the road in the direction of travel and the information display apparatus 12 as a radius is defined as a boundary N. The information display apparatus 12 changes the display mode for each boundary where the guided person is located. For example, as illustrated in FIG. 4B, a display mode of display 2 when the guided person is at a position 2 and a display mode of display 1 when the guided person is at a position 1 are different from each other, and the displays are changed to images (for example, arrow images) that indicate routes, according to the respective positions. That is, when the guided person is farther than the boundary N, displayed is an arrow image indicating a direction of travel in a (wide area) route corresponding to a distance farther than the boundary N. When the guided person is closer than the boundary N, displayed is an arrow image indicating a direction of travel in a route that corresponds to a distance farther from the boundary (N−1) and that is a more detailed route than the route corresponding to the distance farther than the boundary N. In this case, examples of the display mode which is changed according to the distance between the information display apparatus 12 and the guided person include changing of the size of characters or an image as well as the shape of an arrow image to be displayed. In this case, the information display apparatus 12 increases the size of the characters or the image when the guided person is farther than the boundary N and decreases the size of the characters or the image when the guided person is closer than the boundary N.

Figure 5A:
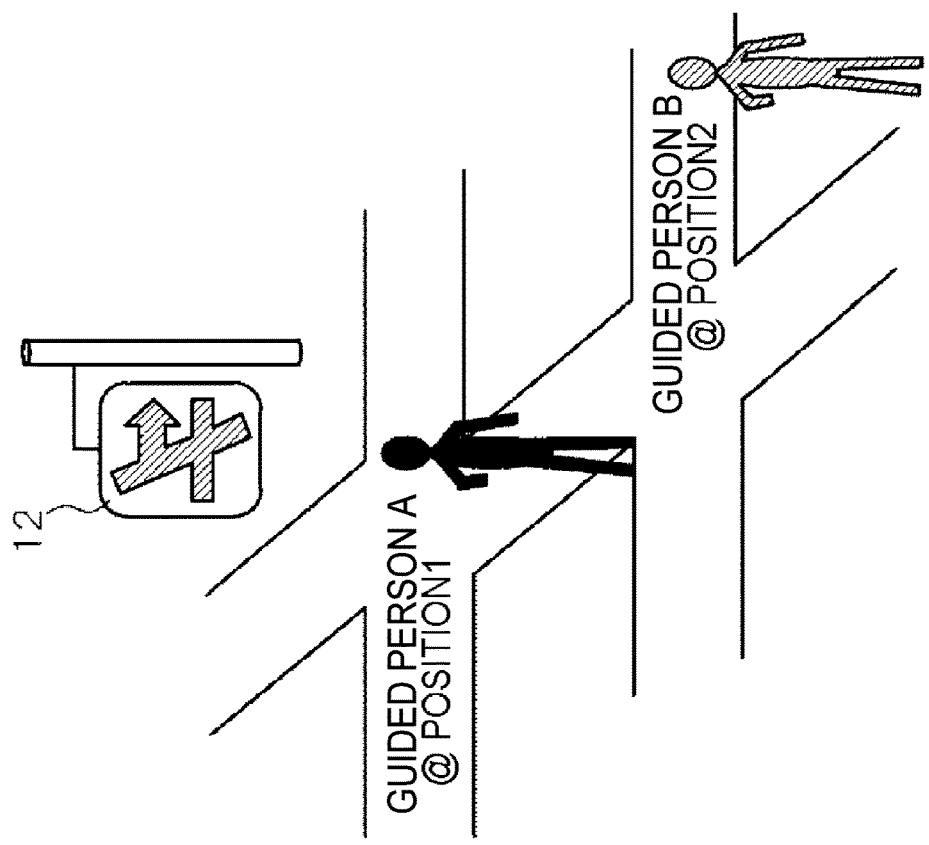
FIG. 5A is a diagram illustrating an example of displaying the route guidance information for a guided person A at a position 1.
Figure 5B:
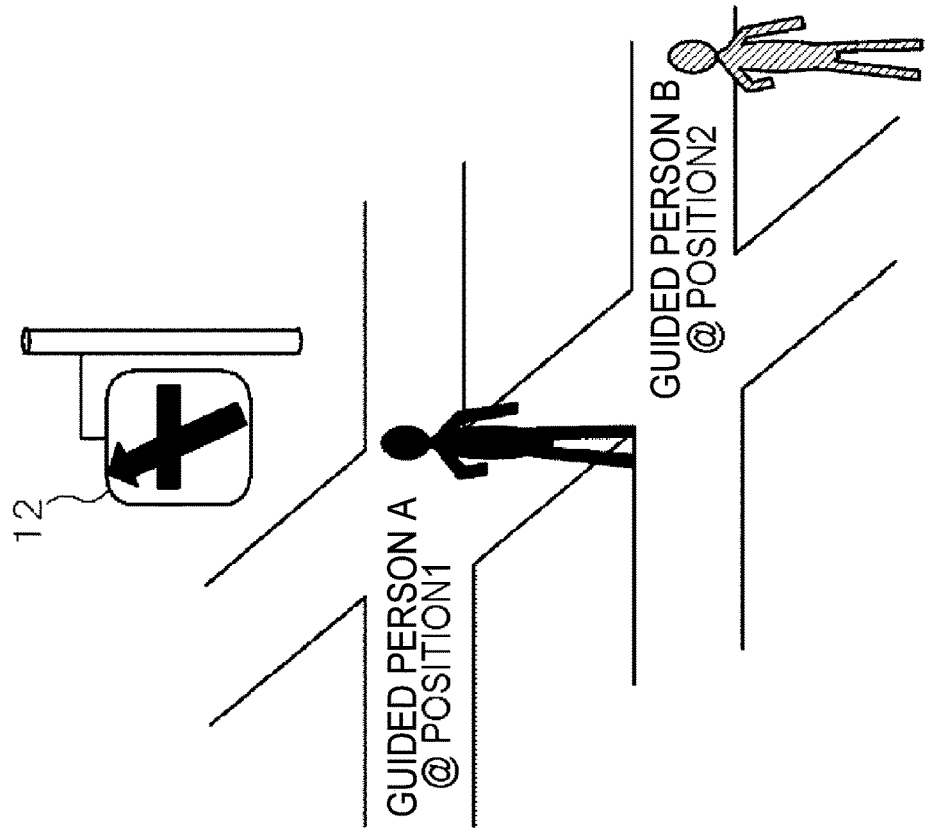
FIG. 5B is a diagram illustrating an example of displaying the route guidance information for a guided person B at a position 2.

When the display mode is changed in this manner and when there are plural guided persons having different destinations, the information display apparatus 12 displays the route guidance together with the target information (such as the color, the icon, and the symbol mark) representing the respective guided persons as illustrated in FIGS. 5A and 5B. In this case, display for the guided person A who is at the position 1 in FIG. 5A and display for the guided person B who is at the position 2 in FIG. 5B may be displayed side by side or in a time division manner. Alternatively, based on the user information on the guided person which is registered in the information management apparatus 18 by the information input apparatus 16 in advance, switching between (i) a parallel display of displaying the guided persons side by side and (ii) a time-division display of displaying the guided persons in a time division manner may be performed according to an age, a walking speed, the presence or absence of a baggage, and the like of the guided person.

Subsequently, a specific process performed by the thus-configured information presentation system 10 according to the exemplary embodiment configured as described above will be described.

Figure 6:
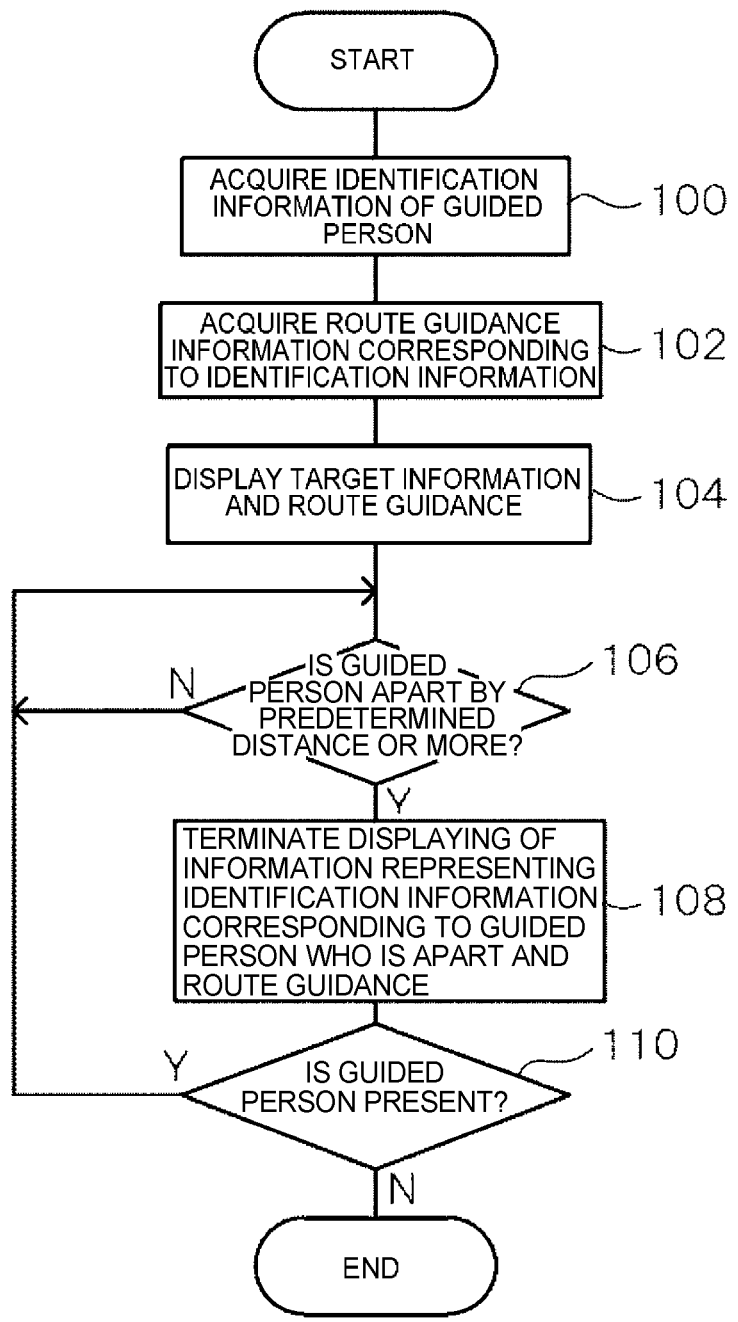
FIG. 6 is a flowchart illustrating an example of a flow of a process performed by an information display apparatus of an information presentation system according to the exemplary embodiment.

FIG. 6 is a flowchart illustrating an example of a flow of a process performed by the information display apparatus 12 of the information presentation system 10 according to the exemplary embodiment. The process of FIG. 6 starts when the guided person who carries the ID transmission apparatus 14 approaches the predetermined range of the information display apparatus 12 and the information display apparatus 12 detects the ID transmission apparatus 14.

In step 100, the detector 12A of the information display apparatus 12 acquires the identification information of the guided person from the detected ID transmission apparatus 14, and the process proceeds to step 102. That is, the detector 12A of the information display apparatus 12 detects a target person to whom the route guidance information is to be displayed by acquiring the identification information of the guided person from the ID transmission apparatus 14 which exists within the predetermined range.

In step 102, the detector 12A of the information display apparatus 12 acquires the route guidance information corresponding to the identification information, which is acquired from the ID transmission apparatus 14, from the information management apparatus 18. Then, the process proceeds to step 104. For example, the information display apparatus 12 transmits the identification information to the information management apparatus 18 to thereby request the information management apparatus 18 to transmit the route guidance information of the guided person which corresponds to the identification information. The information management apparatus 18 reads the destination corresponding to the identification information from the user information DB 24, reads the position information of the information display apparatus 12 which is a request source from the position information DB 26, searches the route information stored in the route information DB 22 for the route guidance information from the information display apparatus 12 which is the request source to the destination, and returns a search result to the information display apparatus 12. Since the route information is searched for using the well-known technology, a detailed description thereof will be omitted.

In step 104, the display 12B of the information display apparatus 12 displays the route guidance information acquired from the information management apparatus 18 and the target information representing the guided person. Then, the process proceeds to step 106. As a result, even if the guided persons having the plural different destinations are present near the information display apparatus 12, the route guidance information is displayed together with the target information. Therefore, the route guidance information is presented to each of the guided persons.

In step 106, the information display apparatus 12 determines whether the guided person is apart from the information display apparatus 12 by a predetermined distance or more. For example, the information display apparatus 12 determines whether the ID transmission apparatus 14 moves out of the predetermined range in which the detector 12A of the information display apparatus 12 is able to detect the ID transmission apparatus 14. The process stands by until the affirmative determination is made. If the determination result is affirmative, then the process proceeds to step 108.

In step 108, the information display apparatus 12 terminates displaying of the target information and route guidance information which correspond to the guided person who is apart from the information display apparatus 12. Then, the process proceeds to step 110.

In step 110, the detector 12A of the information display apparatus 12 determines whether a guided person is present nearby. In this determination, the information display apparatus 12 determines whether the ID transmission apparatus 14 from which the information display apparatus 12 is able to acquire the identification information is present. If the affirmative determination is made, the process returns to step 106 to repeat the processes. If the negative determination is made as the ID transmission apparatus 14 from which the information display apparatus 12 is able to acquire the identification information disappears, then a series of processes is terminated.

Figure 7:
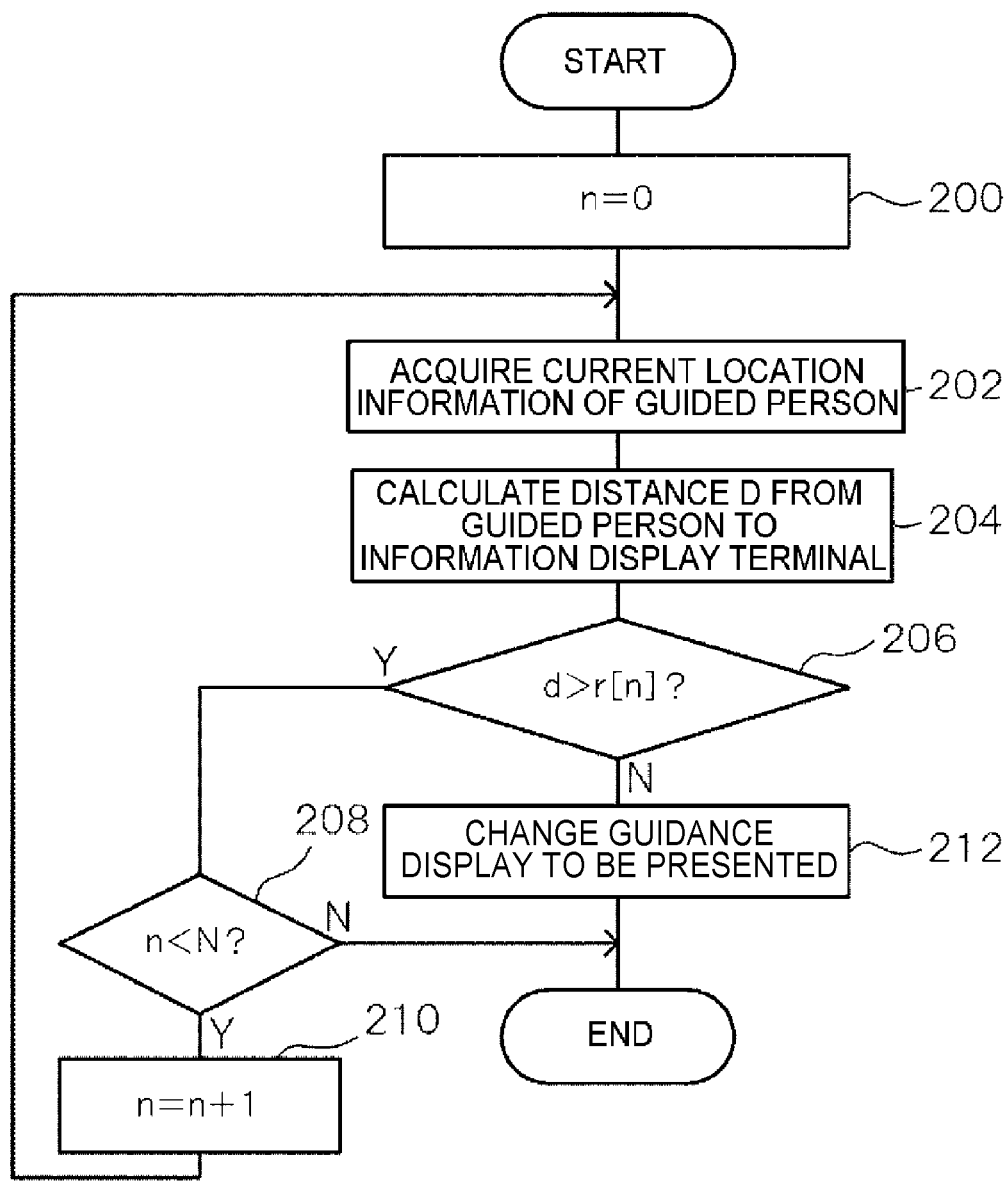
FIG. 7 is a flowchart illustrating an example of a flow of a route guidance display switch process performed by the information display apparatus of the information presentation system according to the exemplary embodiment.

Subsequently, a specific process performed by the information display apparatus 12 in the case of switching between the display modes of the route guidance information according to the distance between the guided person and the information display apparatus 12 will be described. FIG. 7 is a flowchart illustrating an example of a flow of a route guidance display switch process performed by the information display apparatus 12 of the information presentation system 10 according to the exemplary embodiment. The process of FIG. 7 is, for example, a process performed by the information display apparatus 12 when the guided person moves after the route guidance information is displayed in step 104 described above and the display mode of the route guidance information is changed according to the distance to the information display apparatus 12. The process of FIG. 7 will be described as a process that focuses on changing of the route guidance information.

In step 200, the information display apparatus 12 resets a variable n (n=0), and the process proceeds to step 202.

In step 202, the detector 12A of the information display apparatus 12 acquires current location information of the guided person, and the process proceeds to step 204. For example, when the guided person carries the ID transmission apparatus 14 to which the wireless tag, or the like is applied, plural sensors or the like that detect the wireless tag are provided on the route, and information for identifying the sensor that detects the wireless tag may be acquired as the current location information. Alternatively, the distance from the detector 12A of the information display apparatus 12 to the guided person may be acquired as substitute information for current location information, based on a communication strength of the wireless tag or the like. Further, when the guided person carries the ID transmission apparatus 14 to which the portable terminal is applied, the current location information measured by the GPS or the like may be acquired.

In step 204, the detector 12A of the information display apparatus 12 calculates a distance d from the guided person to the information display apparatus 12, and the process proceeds to step 204. For example, when the guided person carries the ID transmission apparatus 14A to which the wireless tag or the like is applied and the sensors that detect the wireless tag are provided on the route, a distance from a position of the sensor that detects the wireless tag to the information display apparatus 12 is acquired as the distance d. Further, when the guided person carries the ID transmission apparatus 14A to which the wireless tag or the like is applied and the communication strength of the wireless tag is acquired as the substitute information for the current location information, the distance from the information display apparatus 12 to the guided person is acquired based on the communication strength of the wireless tag. Also, when the guided person carries the ID transmission apparatus 14B to which the portable terminal having the positioning function is applied, the distance is calculated by the formula $$\text{distance } d = |\text{current location} - \text{position of information display apparatus}|$$

based on the position of the information display apparatus 12 and the current location information of the guided person.

In step 206, the information display apparatus 12 determines if d>r[n]. In this determination, the information display apparatus 12 determines whether the radius r [n] of the circle having the center at the position of the information display apparatus 12 and having the normal line connecting the road (n−1)-th intersecting with the road in the direction of travel and the information display apparatus 12 as the radius is smaller than the distance d calculated in step 202. That is, the information display apparatus 12 determines whether the position of the guided person is outside the radius r[n] of the circle having the center at the position of the information display apparatus 12. If the guided person approaches within the radius r[n] of the circle having the center at the position of the information display apparatus and the negative determination is made, the process proceeds to step 212. If the affirmative determination is made, the process proceeds to step 208.

In step 208, the information display apparatus 12 determines if n<N (where N is a predetermined value). If the affirmative determination is made, the process proceeds to step 210. If the negative determination is made, the route guidance display switching process is terminated.

In step 210, the information display apparatus 12 increments n by 1 (n=n+1), and the process returns to step 202 to repeat the process.

On the other hand, in step 212, the information display apparatus 12 changes the route guidance display to be presented and terminates the route guidance display switching process. For example, when the guided person is at the position 1 which is farther from the information display apparatus 12 than the boundary 2 illustrated in FIG. 4B, displaying is performed in the display mode illustrated in display 1. When the guided person moves to the position 2 on the boundary 1, the display mode of the route guidance information is switched as illustrated in display 2. As a result, the route guidance information which is changed to a road shape viewed from the position of the guided person is displayed. Further, when the display mode of the route guidance information is changed, for example, the route guidance information to be changed is acquired from the information management apparatus 18 and displayed.

Figure 8:
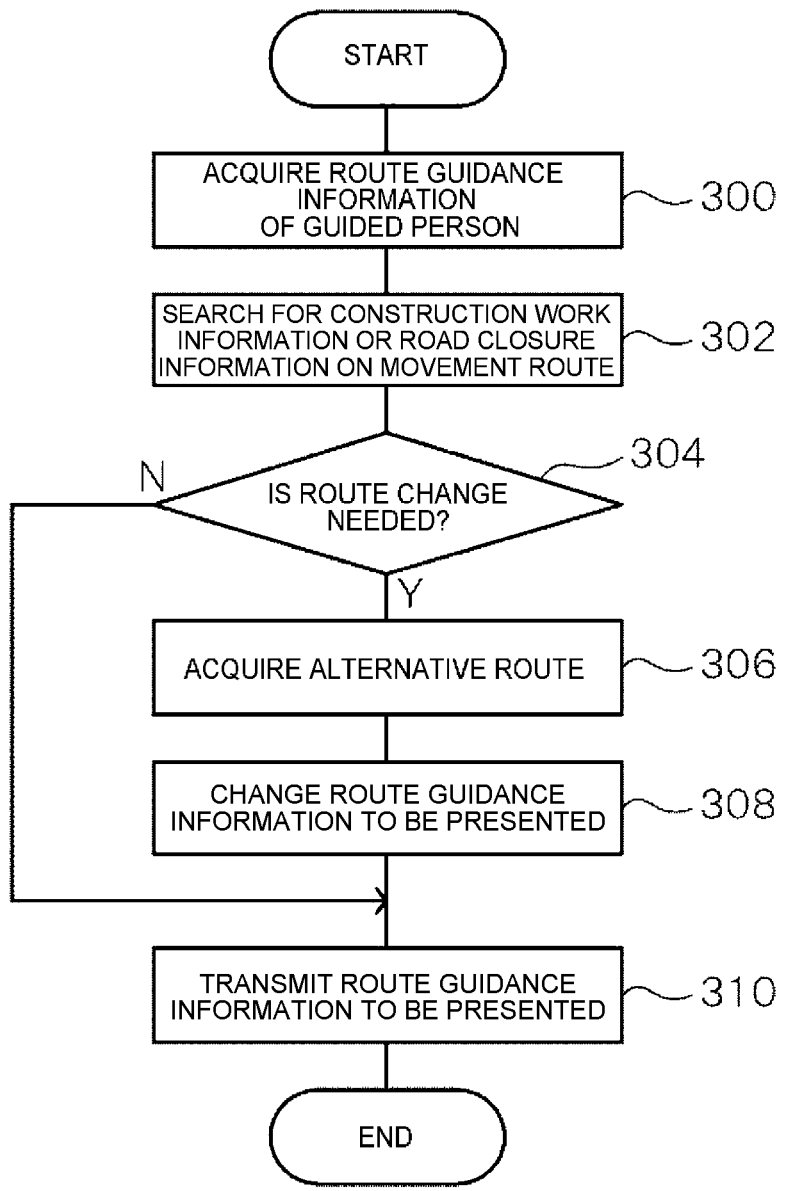
FIG. 8 is a flowchart illustrating an example of a flow of a process performed by t an information management apparatus of the information presentation system according to the exemplary embodiment.

Subsequently, a process which is performed when the information management apparatus 18 searches for the route guidance information in response to a request from the information display apparatus 12 will be described. That is, the process performed by the information management apparatus 18 when the information display apparatus 12 requests the information management apparatus 18 to transmit the route guidance information in order to acquire the route guidance information from the information management apparatus 18 in step 102 described above will be described. FIG. 8 is a flowchart illustrating an example of a flow of the process performed by the information management apparatus 18 of the information presentation system 10 according to the exemplary embodiment. Further, the process in FIG. 8 is an example of a process in a case where the route is changed due to a predictable cause such as construction work or a scheduled road closure.

In step 300, the information management apparatus 18 acquires the route guidance information of the guided person, and the process proceeds to step 302. That is, the information management apparatus 18 acquires the route guidance information which is searched for in response to the request from the information display apparatus 12 in step 102 described above.

In step 302, the information management apparatus 18 searches for construction work information or road closure information (date and time, and place) on a movement route of the route guidance information, and the process proceeds to step 304. In the search for the construction work information or the road closure information, for example, the information management apparatus 18 searches information provided by an information center that manages roads and the like.

In step 304, the information management apparatus 18 determines whether route change is needed. In this determination, the information management apparatus 18 determines whether the date and time and the place of the construction work information or the road closure information in the movement route of the route guidance information match. If the affirmative determination is made, the process proceeds to step 306. If the negative determination is made, the process proceeds to step 310.

In step 306, the information management apparatus 18 acquires an alternative route, and the process proceeds to step 308. In the acquiring of the alternative route, the route change unit 20 searches the routes stored in the route information DB 22 for the alternative route and acquires the alternative route.

In step 308, the information management apparatus 18 changes the presented route to the alternative route which is acquired through the search, and the process proceeds to step 310.

In step 310, the information management apparatus 18 transmits the route guidance information to be presented to the information display apparatus 12 and terminates a series of processes. That is, if the route change is not needed, the information management apparatus 18 transmits the route guidance information acquired in step 300 to the information display apparatus 12. Meanwhile, if the route change is needed, the information management apparatus 18 transmits the alternative route acquired in step 306 to the information display apparatus 12 as the route guidance information.

Figure 9:
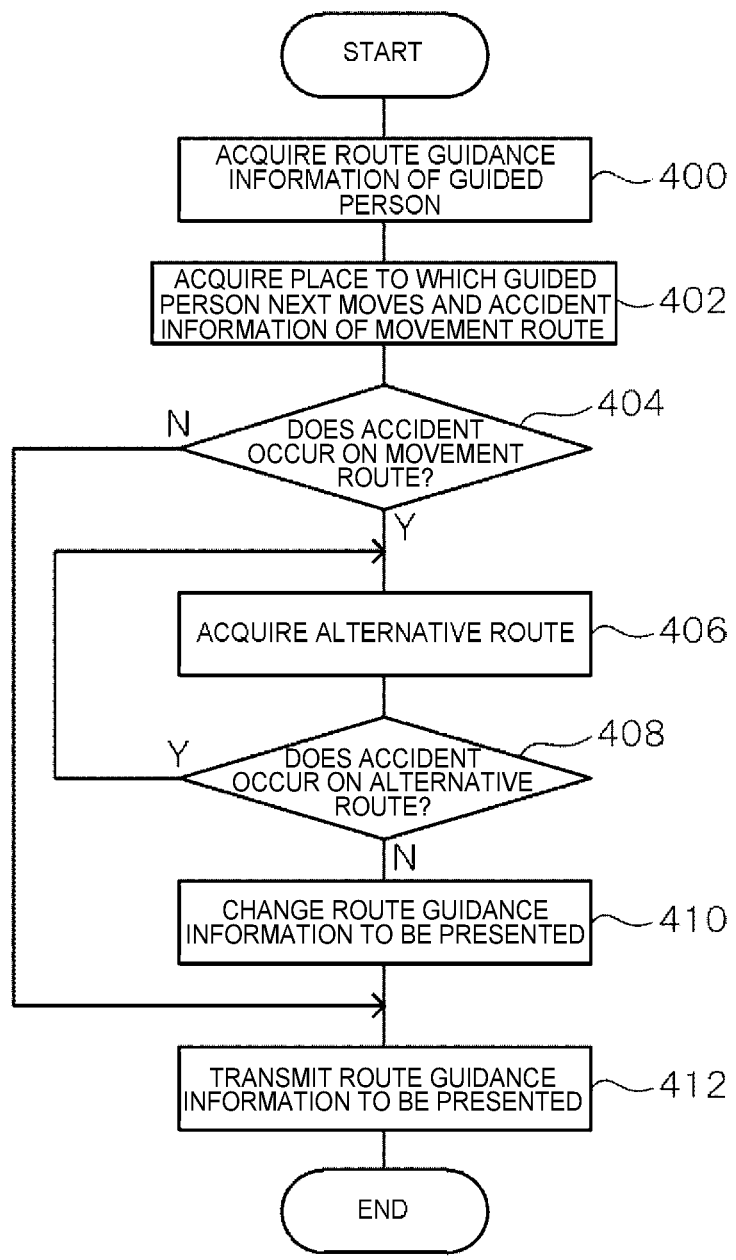
FIG. 9 is a flowchart illustrating a modified example of the flow of the process performed by the information management apparatus of the information presentation system according to the exemplary embodiment.

Subsequently, a modified example of the process performed by the information management apparatus 18 will be described. FIG. 9 is a flowchart illustrating a modified example of the flow of the process performed by the information management apparatus 18 of the information presentation system 10 according to the exemplary embodiment. The process in FIG. 9 is an example of a process when the route is changed due to an unpredictable cause such as an accident or a natural disaster.

In step 400, the information management apparatus 18 acquires the route guidance information of the guided person, and the process proceeds to step 402. That is, the information management apparatus 18 acquires the route guidance information which is searched for in response to the request from the information display apparatus 12 in step 102 described above.

In step 402, the information management apparatus 18 acquires a location to which the guided person next moves and accident information of the movement route, and the process proceeds to step 404. As to the acquisition of the accident information, for example, the information management apparatus 18 may acquire the information provided by the information center that manages roads or the like, acquire information from various sensors provided on the route as the accident information, or acquire images captured by a camera provided in the information display apparatus 12 as the accident information.

In step 404, the information management apparatus 18 determines whether an accident occurs on the movement route. This determination is made based on the accident information acquired in step 404. If the affirmative determination is made, the process proceeds to step 406. If the negative determination is made, the process proceeds to step 412.

In step 406, the information management apparatus 18 acquires an alternative route, and the process proceeds to step 408. As to the acquisition of the alternative route, the route change unit 20 searches the routes stored in the route information DB 22 for the alternative route and acquires the alternative route.

In step 408, the information management apparatus 18 determines whether an accident occurs on the alternative route. This determination is made in the same manner as in step 404. If the negative determination is made, the process returns to step 406 to search for the alternative route again and repeat the process until the alternative route on which no accident occurs is found. If the affirmative determination is made, the process proceeds to step 410.

In step 410, the information management apparatus 18 changes the presented route to the alternative route which is acquired through the search, and the process proceeds to step 412.

In step 412, the information management apparatus 18 transmits the route guidance information to be presented to the information display apparatus 12 and terminates a series of processes. That is, if no accident occurs on the movement route, the information management apparatus 18 transmits the route guidance information acquired in step 400 to the information display apparatus 12. Meanwhile, if an accident occurs on the movement route, the information management apparatus 18 transmits the alternative route acquired in step 406 to the information display apparatus 12 as the route guidance information.

Figure 10:
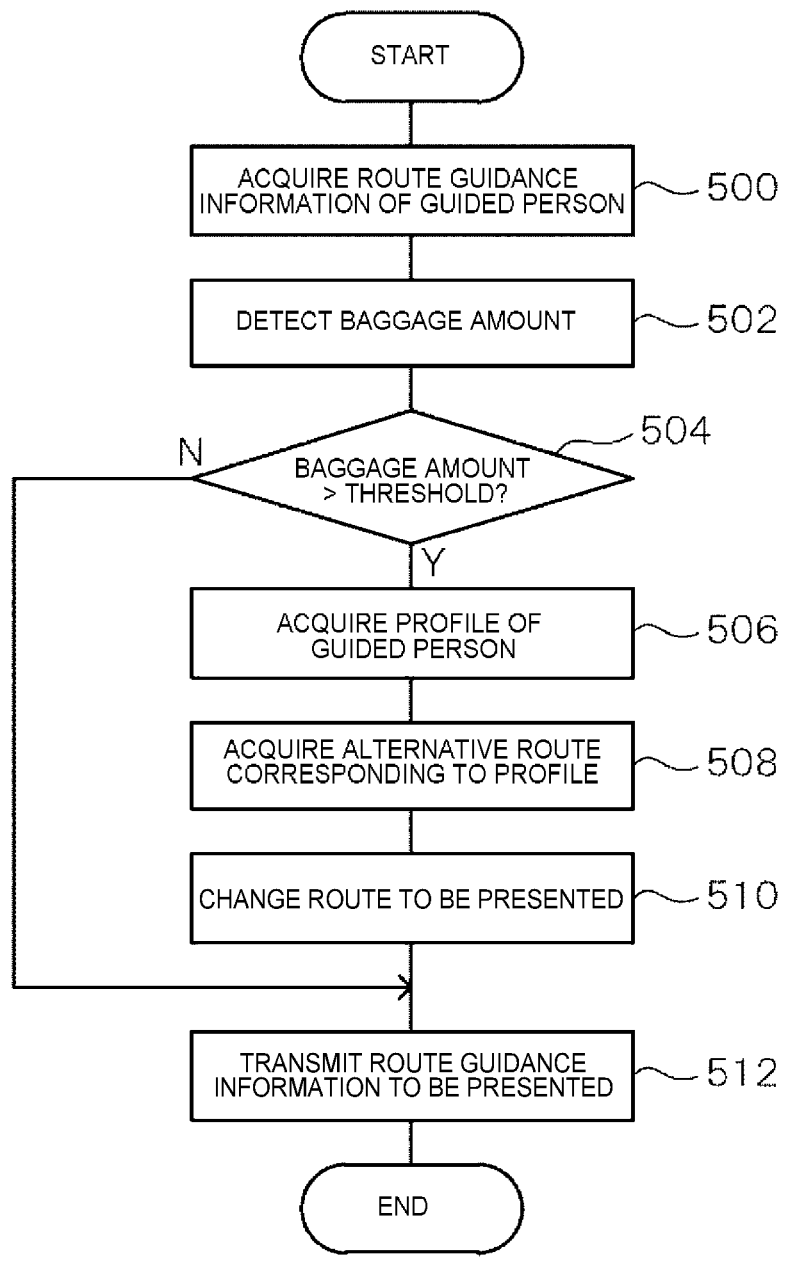
FIG. 10 is a flowchart illustrating another modified example of the flow of the process performed by the information management apparatus of the information presentation system according to the exemplary embodiment.

Subsequently, another modified example of the process performed by the information management apparatus 18 will be described. FIG. 10 is a flowchart illustrating another modified example of the flow of the process performed by the information management apparatus 18 of the information presentation system 10 according to the exemplary embodiment.

In step 500, the information management apparatus 18 acquires the route guidance information of the guided person, and the process proceeds to step 502. That is, the information management apparatus 18 acquires the route guidance information which is searched for in response to the request from the information display apparatus 12 in step 102 described above.

In step 502, the information management apparatus 18 detects a baggage amount of the guided person, and the process proceeds to step 504. As to a method for detecting the baggage amount, for example, the guided person may input the baggage amount when inputting the destination to the information input apparatus 16, and the baggage amount may be detected from the input information. Alternatively, the baggage amount may be detected based on a detection result of the acceleration detector 38 of the ID transmission apparatus 14B. In this case, for example, the detection result of the acceleration detector 38 when the guided person walks without carrying the baggage or the like is registered in advance and compared with the current detection result of the acceleration detector 38. The presence or absence of the baggage and the baggage amount are detected by detecting if the guided person walks slowly. Alternatively, the presence or absence of the baggage and the baggage amount may be detected by detecting the walking speed of the guided person by various sensors such as the acceleration detector provided in the wearable terminal.

In step 504, the information management apparatus 18 determines whether the detected baggage amount is larger than a threshold value. For example, when the determination is made based on the input information to the information input apparatus 16, the information management apparatus 18 determines whether the number of the baggage or the weight of the baggage is larger than a predetermined threshold value. Further, when the determination is made based on the detection result of the acceleration detector 38 or the like, the information management apparatus 18 may estimate whether the current walking speed is slower than the walking speed during normal walking may, from the detection result of the acceleration detector 38. If the affirmative determination is made, the process proceeds to step 506. If the negative determination is made, the process proceeds to step 512.

In step 506, the information management apparatus 18 acquires a profile of the guided person, and the process proceeds to step 508. As to the profile of the guided person, for example, when the guided person is registered by the information input apparatus 16, profile information is registered. As the profile, for example, information regarding whether a stairway needs to be used, small baggage, a handicapped person, an injured person, the presence or absence of a stroller, a lot of baggage, an age (for example, 70 years old or more), and the like are registered in advance.

In step 508, the information management apparatus 18 acquires the alternative route corresponding to the profile, and the process proceeds to step 510. As to the acquisition of the alternative route, the route change unit 20 searches the routes stored in the route information DB 22 for the alternative route corresponding to the profile and acquires the alternative route corresponding to the profile. For example, when information indicating that there is a stroller is registered as the profile, an alternative route avoiding the stairway is searched for and acquired.

In step 510, the information management apparatus 18 changes the route to be presented to the alternative route which is acquired through the search, and the process proceeds to step 512.

In step 512, the information management apparatus 18 transmits the route guidance information to be presented to the information display apparatus 12 and terminates a series of processes. That is, if the baggage amount is equal to or less than the threshold value, the information management apparatus 18 transmits the route guidance information acquired in step 500 to the information display apparatus 12. On the other hand, if the baggage amount is more than the threshold value, the information management apparatus 18 transmits the alternative route acquired in step 508 to the information display apparatus 12 as the route guidance information.

Figure 11:
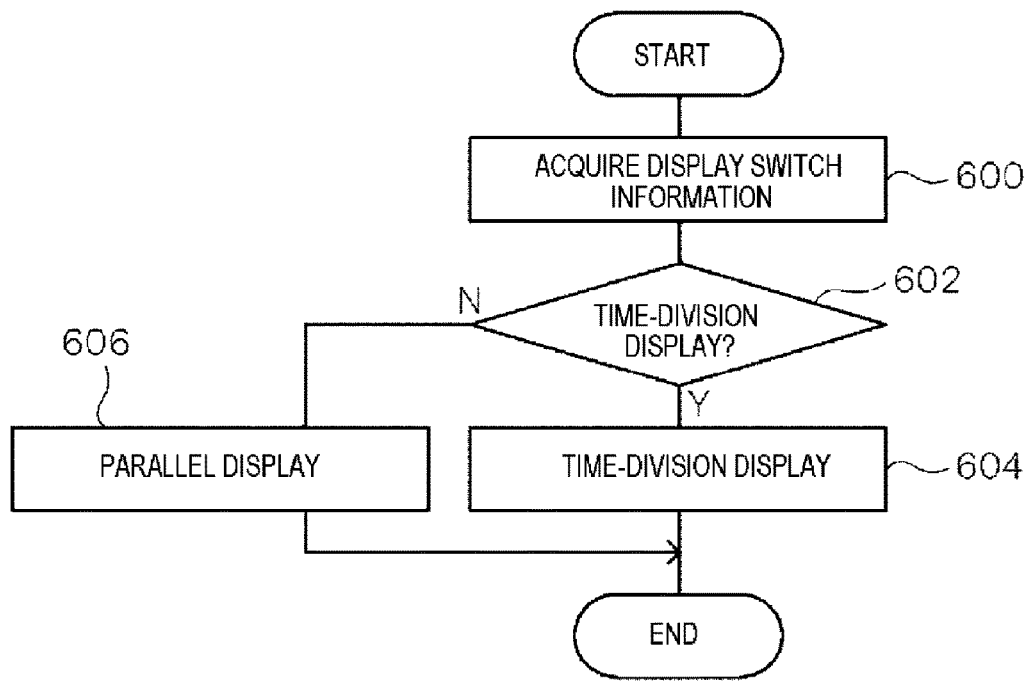
FIG. 11 is a flowchart illustrating an example of a flow of a process when the information display apparatus of the information presentation system according to the exemplary embodiment determines a display method in order to display the route guidance information to a guided person.

Subsequently, when the information display apparatus 12 displays the route guidance information of plural guided persons having different destinations, a process of switching between a case where the route guidance for the respective guided persons is displayed side by side and a case where the route guidance is displayed in a time division manner based on a predetermined condition will be described. FIG. 11 is a flowchart illustrating an example of a flow of a process when the information display apparatus 12 of the information presentation system 10 determines a display method in order to display the route guidance information for the guided person according to the exemplary embodiment.

In step 600, the information display apparatus 12 acquires display switch information, and the process proceeds to step 602. For example, the profile or the like of the guided person is acquired as the display switch information. When the profile is registered, parallel display or time-division display is registered as well as the information described above.

In step 602, the information display apparatus 12 determines whether to perform the time-division display, based on the acquired display switch information. In this determination, the information display apparatus 12 determines whether to perform the time-division display or the parallel display. If the affirmative determination is made, the process proceeds to step 604. If the negative determination is made, the process proceeds to step 606. In the determination of step 602, for example, it may be determined whether the time-division display has been set as the profile. Alternatively, when the number of guided persons is large and the parallel display is performed, the contents need to be displayed small, otherwise the contents may not be displayed. Thus, it may be determined whether the number of guided persons is equal to or larger than a predetermined number. Alternatively, since a larger image or characters may be displayed in the time-division display, it may be determined whether an age is equal to or smaller than a predetermined age. Alternatively, it may be determined whether the walking speed is equal to or lower than a predetermined speed. Alternatively, since a larger image or characters in the time-division display may be displayed than an image or characters in the parallel display regardless of the number of guided persons, it may be determined whether the distance to each guided person is equal to or more than a predetermined distance.

In step 604, when the information display apparatus 12 displays the route guidance information, the information display apparatus 12 is set to display the route guidance information in the time division manner for each of the plural guided persons having the different destinations at a time of displaying the route guidance information, and terminates a series of processes. Further, when the route guidance information is displayed in the time division manner, a time during which the route guidance information is displayed in the time division manner may vary according to the age of the guided person. For example, since a more elderly person takes a longer recognition time due to his/her age, the display time may be shortened for the younger age. Alternatively, the size of the characters or image displayed in the time division manner may vary according to the age of the guided person. For example, the size of the displayed characters or image may be increased as the age becomes higher.

In step 606, when the information display apparatus 12 displays the route guidance information, the information display apparatus 12 is set to display the respective route guidance of the plural guided persons having the different destinations side by side, and terminates a series of processes. In the case of the parallel display, there is a limit in the number of displays according to the size of a display area. Therefore, when it is not possible to display the route guidance information, the route guidance information is displayed in the parallel display manner in a displayable range. The route guidance information that is not able to be displayed in the parallel display manner may be displayed in the time division manner.

When plural guided persons to whom identical information is to be displayed are present, the information management apparatus 18 of the exemplary embodiment described above may generate group information indicating that the guided persons are the plural guided persons to whom the identical information is to be displayed as the target information by the generation unit 21 of the information management apparatus 18, and transmit the generated group information to the portable terminal carried by each guided person. For example, when the guided person carries the ID transmission apparatus 14B, the notification unit 12C of the information display apparatus 12 may transmit the group information to the ID transmission apparatus 14B to notify the group information to the guided person. Further, when the guided person carries the ID transmission apparatus 14A, the notification unit 12C of the information display apparatus 12 may transmit the group information to the portable terminal having a function of notifying information received from the outside to notify the group information to the guided person. As a specific example of the group information, for example, information (a color, an icon, a symbol mark, a symbol, a nickname, or the like) similar to the aforementioned target information may be adopted. In addition, the group information may be generated, for example, by performing the process illustrated in FIG. 12 at the time of the user registration and notified to the guided person.

That is, in step 700, the information management apparatus 18 acquires the user information registered by the user registration, and the process proceeds to step 702.

In step 702, the generation unit 21 of the information management apparatus 18 determines whether there are plural guided persons having an identical destination, based on the user information. If the affirmative determination is made, the process proceeds to step 704. If the negative determination is made, the process proceeds to step 708.

In step 704, the generation unit 21 of the information management apparatus 18 generates the group information indicating the guided persons having the identical destination as the target information, and the process proceeds to step 706. For example, if there are plural guided persons whose destination is the Yokohama station, group information indicating that the plural guided persons are represented by red symbol marks is generated as the target information.

In step 706, the generation unit 21 of the information management apparatus 18 transmits the generated group information to the portable terminals of the guided persons who have the identical destination and the information display apparatus 12. The notification unit 12C of the information display apparatus 12 notifies the group information to the portable terminals of the guided persons. Thereby, a message such as "the information for you is displayed with the red symbol mark" is displayed on the portable terminals of the guided persons, to notify the target information to the guided persons. Further, when the presentation information is displayed to the guided persons, the red symbol mark is displayed on the display 12B of the information display apparatus 12 together as the corresponding target information.

On the other hand, in step 708, the information management apparatus 18 generates the target information representing the guided persons, and the process proceeds to step 710.

In step 710, the generation unit 21 of the information management apparatus 18 transmits the generated target information to the portable terminals of the guided persons and the information display apparatus 12. The notification unit 12C of the information display apparatus 12 notifies the target information to the portable terminals of the guided persons. Thereby, the target information is notified to the guided persons, and when the display 12B of the information display apparatus 12 displays the presentation information corresponding to the guided persons, the corresponding target information are displayed.

Figure 12:
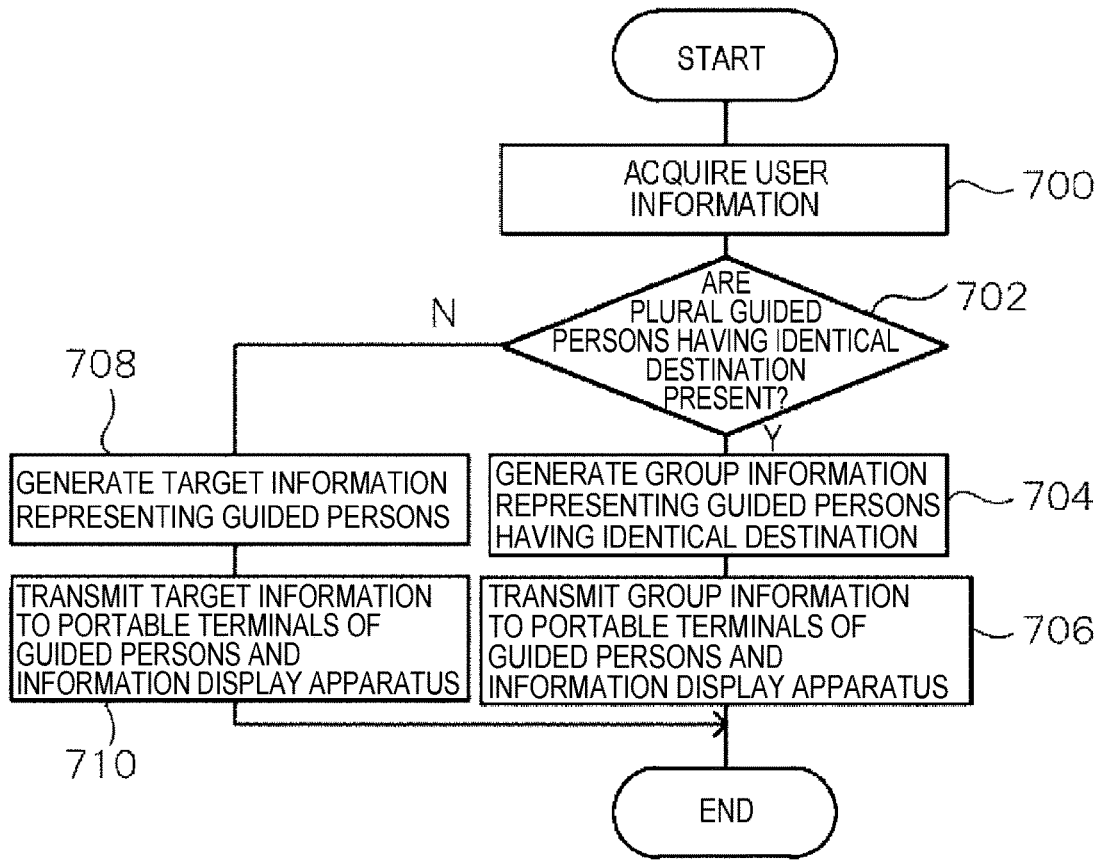
FIG. 12 is a flowchart illustrating an example of a flow of a process performed when a user is registered in the information management apparatus of the information presentation system according to the exemplary embodiment.

In the exemplary embodiment, the description has been made premised on that the process of FIG. 12 is performed by the information management apparatus 18 at the time of the user registration. It should be noted that the exemplary embodiments are not limited thereto. For example, the process may be performed when the detector 12A of the information display apparatus 12 detects the guided person within the predetermined range (for example, when the process of step 100 is performed). In this case, in step 706, the notification unit 12C of the information display apparatus 12 transmits the generated group information to the portable terminals of the guided persons who have the identical destination, and in step 710, the notification unit 12C may transmit the generated target information to the portable terminals of the guided persons.

Further, in the exemplary embodiment, an example of presenting the route guidance information to the guided person as the presentation information has been described. It should be noted that the presentation information is not limited to the route guidance information. Other information may be presented. For example, instead of presenting even the route guidance information, character information such as a schedule including the date and time along with the place may be used as the presentation information. In this case, as an example of setting different display modes according to the distance from the information display apparatus 12 to the guided person, the character size may be changed and displayed according to the distance.

In addition, the processes performed by the respective apparatuses of the information presentation system 10 according to the exemplary embodiment (FIGS. 6 to 11) may be a process performed by software, a process performed by hardware, or a combination thereof. In addition, the process performed by each apparatus of the information presentation system 10 may be stored as a program in a storage medium for distribution.

In addition, the processes performed by the respective apparatuses of the information presentation system 10 according to the exemplary embodiment (FIGS. 7 to 11) are described by illustrating the apparatuses which are executed as one example, respectively. Alternatively, apparatuses other than the aforementioned apparatuses may be executed. For example, in the process of FIG. 7, the information display apparatus 12 calculates the distance from the guided person to the information display apparatus 12 and changes the route guidance display presented in accordance with the distance. Alternatively, the information management apparatus 18 may calculate the distance from the guided person to the information display apparatus 12 and instruct the information display apparatus 12 to change the route guidance display according to the distance.

In addition, the exemplary embodiments are not limited to the above. Various modifications of the present invention may be made within the range without departing from the gist of the exemplary embodiments.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information presentation apparatus comprising:
a hardware detector that detects a predetermined target person to whom information is to be presented; and
a display, wherein
when a plurality of target persons to whom pieces of different information are to be presented, respectively are detected by the detector, the display displays target information that indicates each of the target persons and presentation information that corresponds to each of the target persons,
the information presentation apparatus is configured to determine whether to perform (i) a time-division display of displaying the target information and the presentation information together in a time division manner for each of the plurality of target persons, or (ii) a parallel display of displaying the target information and the presentation information for each target person side by side for the plurality of target persons at the same time, and
the display performs the time-division display in response to determining to perform the time-division display, and performs the parallel display in response to determining to perform the parallel display.

2. The information presentation apparatus according to claim 1, wherein the display displays the presentation information in different display modes according to a distance to each target person detected by the detector.

3. The information presentation apparatus according to claim 2, wherein the display mode is an image that indicates a route that is in a field of view of each target person detected by the detector.

4. The information presentation apparatus according to claim 1, wherein the display switches between the time-division display and the parallel display, based on a predetermined condition.

5. The information presentation apparatus according to claim 4, wherein
the predetermined condition includes a condition such that target persons, the number of the target persons being less than a predetermined number, are detected by the detector, and
the display performs the parallel display when the predetermined condition is met.

6. The information presentation apparatus according to claim 4, wherein
the predetermined condition includes a condition such that target persons, the number of target persons being equal to or larger than a predetermined number, are detected by the detector, and
the display performs the time-division display when the predetermined condition is met.

7. The information presentation apparatus according to claim 4, wherein
the predetermined condition includes a condition such that a target person who is present at a position distant from the display by a predetermined distance or longer is detected by the detector, and
the display performs the time-division display when the predetermined condition is met.

8. The information presentation apparatus according to claim 4, wherein
the predetermined condition includes a condition such that a target person who is present at a position distant from the display by a distance less than a predetermined distance is detected by the detector, and
the display performs the parallel display when the predetermined condition is met.

9. The information presentation apparatus according to claim 1, wherein when there is a constraint condition which is set in advance by the target person detected by the detector, the display displays the presentation information corresponding to the constraint condition.

10. The information presentation apparatus according to claim 1, further comprising:
at least one processor programmed to:
when a plurality of target persons to whom identical presentation information is to be presented are present, generate group information indicating the plurality of target persons as the target information; and
notify the plurality of target persons of the group information.

11. An information presentation system comprising:
the information presentation apparatus according to claim 1; and
at least one processor programmed to:
transmit identification information for identifying the target persons in order for the detector to detect the target persons; and
manage information on the target person for each identification information, store the presentation information to be presented to the target persons detected by the detector, and search for the presentation information in response to a request to transmit the presentation information to the information presentation apparatus which is a request source.

12. The information presentation system according to claim 11, wherein
the at least one processor is further programmed to:
generate group information representing the plurality of target persons as the target information when the plurality of target persons to whom identical presentation information is to be displayed are present; and
notify the plurality of target persons of the group information.

13. The information presentation system according to claim 12, wherein
the at least one processor is further programmed to
have a function of notifying information received from an outside, and
transmit the group information to the plurality of target persons.

14. The information presentation system according to claim 12, further comprising:

portable terminals that are carried by the target persons, each portal terminal having a notification function of notifying information received from an outside, wherein the at least one processor transmits the group information to the portable terminals to notify the plurality of target persons of the group information.

15. The information presentation apparatus according to claim 1, wherein the display simultaneously displays the target information and the presentation information.

16. The information presentation apparatus according to claim 1, wherein the target information includes an indicator that identifies each target person.

17. The information presentation apparatus according to claim 1, wherein the hardware detector detects the predetermined target person to whom the information is to be presented based on a wireless tag.

18. An information presentation method comprising:

detecting a predetermined target person to whom information is to be presented;

when a plurality of target persons to whom pieces of different information are to be presented, respectively are detected, displaying target information that indicates each of the target persons and presentation information that corresponds to each of the target persons;

determining whether to perform (i) a time-division display of displaying the target information and the presentation information together in a time division manner for each of the plurality of target persons, or (ii) a parallel display of displaying the target information and the presentation information for each target person side by side for the plurality of target persons at the same time; and performing the time-division display in response to determining to perform the time-division display, and performing the parallel display in response to determining to perform the parallel display.

19. A non-transitory computer readable medium storing a program that causes a computer to execute an information presentation process, the information presentation process comprising:

detecting a predetermined target person to whom information is to be presented;

when a plurality of target persons to whom pieces of different information are to be presented, respectively are detected, displaying target information that indicates each of the target persons and presentation information that corresponds to each of the target persons;

determining whether to perform (i) a time-division display of displaying the target information and the presentation information together in a time division manner for each of the plurality of target persons, or (ii) a parallel display of displaying the target information and the presentation information for each target person side by side for the plurality of target persons at the same time; and performing the time-division display in response to determining to perform the time-division display, and performing the parallel display in response to determining to perform the parallel display.

* * * * *